(12) United States Patent
Yuki et al.

(10) Patent No.: US 6,851,162 B2
(45) Date of Patent: Feb. 8, 2005

(54) CONCEALED TYPE SLIDE FASTENER WITH SEPARABLE BOTTOM END STOP

(75) Inventors: Kenji Yuki, Toyama-ken (JP); Osamu Igarashi, Toyama-ken (JP)

(73) Assignee: YKK Corporation, Tokyo (JP)

(*) Notice: Subject to any disclaimer, the term of this patent is extended or adjusted under 35 U.S.C. 154(b) by 0 days.

(21) Appl. No.: 10/340,330

(22) Filed: Jan. 10, 2003

(65) Prior Publication Data

US 2003/0140465 A1 Jul. 31, 2003

(30) Foreign Application Priority Data

Jan. 25, 2002 (JP) .................................. 2002-017299

(51) Int. Cl.[7] .............................................. A44B 19/38
(52) U.S. Cl. ............................ 24/433; 24/432; 24/388
(58) Field of Search .......................... 24/432, 433, 387, 24/388, 389, 418, 435

(56) References Cited

U.S. PATENT DOCUMENTS

| | | | |
|---|---|---|---|
| 3,170,207 A | * 2/1965 | Morin .......................... | 24/433 |
| 3,488,239 A | 1/1970 | Heimberger | |
| 4,488,337 A | 12/1984 | Yoshida et al. | |
| 4,516,304 A | 5/1985 | Yoshida et al. | |
| 4,539,733 A | * 9/1985 | Yoshida .......................... | 24/396 |
| 4,660,258 A | * 4/1987 | Horita .......................... | 24/433 |
| 4,976,016 A | * 12/1990 | Takabatake .................... | 24/433 |
| 5,470,516 A | * 11/1995 | Fudaki .......................... | 264/135 |
| 6,205,626 B1 | * 3/2001 | Watanabe et al. .............. | 24/434 |

FOREIGN PATENT DOCUMENTS

| | | |
|---|---|---|
| EP | 0 612 487 A1 | 8/1994 |
| EP | 0 960 581 A2 | 12/1999 |
| JP | 06-245806 | 9/1994 |

\* cited by examiner

*Primary Examiner*—Robert J. Sandy
(74) *Attorney, Agent, or Firm*—Michael S. Leonard; Everest Intellectual Property Law Group

(57) ABSTRACT

A reinforcement tape is stuck to an outer front surface of a fastener tape and a fastener element removed portion at a space portion, in which fastener elements are removed and to which the separable bottom end stop of the concealed type slide fastener, for example, a insert pin or the like is attached, by ultrasonic welding. The reinforcement tape may be, for example, a tape whose front surface is made of a thermoplastic elastomer film while its rear surface is made of hot melt adhesive agent. At the same time of the above sticking, an edge portion is formed into a U shape and its surface is reinforced and then, the insert pin or the like is attached to this portion. The fastener tape itself does not come into contact with a diamond of a slider, even if outer face of the U-shaped edge portion comes into sliding contact with the diamond, so the fastener tape is protected from being worn or damaged.

4 Claims, 8 Drawing Sheets

CONCEALED TYPE SLIDE FASTENER WITH SEPARABLE BOTTOM END STOP

BACKGROUND OF THE INVENTION

1. Field of the Invention

The present invention relates to a concealed type slide fastener with a separable bottom end stop in which a folded portion of a fastener tape, where the separable bottom end stop in the concealed type slide fastener is attached, is reinforced and protected.

2. Description of the Related Art

Conventionally, Japanese Patent Application Laid-Open No. 6-245806 has disclosed a separable bottom end stop attaching portion of a concealed type slide fastener, in which a space portion having no fastener elements is formed in a fastener tape of a long fastener chain, the space portion is soaked entirely with synthetic resin liquid, an opposing edge portion of the fastener tape is formed by heat so as to be inverted into a U shape and hardened, and then, the fastener tape of the space portion is cut, and a box pin and an insert pin of the separable bottom end stop are formed by injection molding with synthetic resin and attached to the fastener tape respectively, thereby reinforcing a portion of the fastener tape on which a separable bottom end stop is to be attached.

Additionally, a separable bottom end stop of a concealed type slide fastener is known, in which a synthetic resin film is fused on a rear face of a fastener tape and the fastener tape is formed in a U-shape in order to hold a strength of a portion of the fastener tape of the concealed type slide fastener to which the separable bottom end stop is to be attached and to gain a soft texture on a surface of the fastener tape, and then, a box pin and a insert pin are respectively attached to the U-shaped portion.

As mentioned in a preceding paragraph, the separable bottom end stop attaching portion, in which the opposing edge portion of the fastener tape is formed by heat so as to be inverted into a U shape by soaking the space portion in the fastener chain of the concealed type slide fastener, should be mentioned specially, because the separable bottom end stop could be attached to the concealed type slide fastener for the first time and the concealed type slide fastener with the separable bottom end stop is put in practical use. However, it is a problem that the fastener tape at the space portion of the fastener chain becomes very stiff so that this portion gives a feeling of disharmony as a product. For the reason, a concealed type slide fastener is considered and produced, in which synthetic resin film is fused on the rear face of the fastener tape so as to reinforce the separable bottom end stop attaching portion and provide with the soft texture. However, according to this concealed type slide fastener, when the insert pin of the separable bottom end stop is inserted into the box upon its use, the fastener tape at the U-shaped folded edge portion of the space portion comes into sliding contact with a diamond of a slider, so that it is worn and it becomes loose thereby indicating that this fastener tape cannot bear a long term use.

The invention has been achieved in views of this problem. That is, a main object of the invention is provide a concealed type slide fastener with a separable bottom end stop, wherein a front surface of a space portion, which has no fastener elements and to which the separable bottom end stop is attached, in the fastener tape of the concealed type slide fastener is provided with some extent of plasticity and a fastener tape at a U-shaped edge portion of the space portion is prevented to be worn and loose by its sliding contact with a diamond of a slider when an insert pin is inserted into a slider and a box, thereby ensuring a long term use.

Further, an object of the invention is to provide a concealed type slide fastener with a separable bottom end stop having a good appearance, wherein a core cord and sewing yarns left at the space portion of the fastener chain of the concealed type slide fastener as a fastener element removed portion is covered and protected together with the fastener tape by a sequence of a reinforcement tape. Alternately, it is another object of the invention to provide a concealed type slide fastener with a separable bottom end stop wherein the core cord and sewing yarns left at the space portion of the fastener chain of the concealed type slide fastener as the fastener element removed portion and the fastener tape are covered with separate reinforcement tapes, so that the U-shaped edge portion is reinforced firmly and such a slide fastener is produced easily.

And further, an object of the invention is to provide a concealed type slide fastener with a separable bottom end stop, wherein the space portion of the fastener chain of the concealed type slide fastener is protected at both front and rear surfaces thereof by synthetic resin film so as to form a firm space portion.

Furthermore, an object of the invention is to provide a concealed type slide fastener with a separable bottom end stop, wherein the box pin and insert pin of the separable bottom end stop can be attached such that the U-shaped edge portion at the space portion of the fastener chain of the concealed type slide fastener is utilized effectively.

SUMMARY OF THE INVENTION

To achieve the above-described object, according to the invention, there is provided a concealed type slide fastener with a separable bottom end stop comprising a pair of fastener tapes and fastener elements, in which the separable bottom end stop is attached to a space portion including a fastener element removed portion and an edge portion formed into a U shape of each of the fastener tapes through a reinforcement tape, wherein the reinforcement tape is stuck to a front surface of the space portion and at least a front surface of the U-shaped edge portion of the fastener tape is covered with the reinforcement tape. The reinforcement tape may be stuck to the fastener tape, for example, by ultrasonic welding polyester base elastomer film through polyester base hot melt adhesive agent, the edge portion of the space portion is formed in a U shape and an outer front surface of the U-shaped edge portion is covered and protected with the reinforcement tape. A box pin and an insert pin of the separable bottom end stop are attached respectively to this edge portion. Consequently, the front surface of the space portion of the concealed type slide fastener with the separable bottom end stop is reinforced and when an insert pin is inserted into a slider or a box, the inserting operation can be carried out smoothly. Further, even if the front surface of the space portion is scraped with a diamond of the slider, the fastener tape is never worn or damaged because the fastener tape does not come into contact with the diamond directly. Therefore, there is such an effect that a concealed type slide fastener with a separable bottom end stop in which the fastener tape is protected and high durability can be obtained.

Preferably, a sequence of the reinforcement tape is stuck to the fastener tape and a fastener element removed portion at the space portion formed on the fastener chain of the concealed type slide fastener, such that it covers and surrounds continuously the fastener tape and the fastener element removed portion, for example, a core cord and sewing yarns. Consequently, there is such an effect that the space portion in the concealed type slide fastener with the separable bottom end stop can be formed into a good appearance and that the box pin and the insert pin of the separable bottom end stop can be attached easily.

Alternately, it is preferable that separate reinforcement tapes are stuck respectively to the fastener tape and the fastener element removed portion at the space portion formed on the fastener chain of the concealed type slide fastener such that they cover and surround separately the fastener tape and the fastener element removed portion, for example, the core cord and the sewing yarns, and end portions of the respective tapes are overlapped and joined together so as to form a joint portion. Consequently, there is such an effect that the reinforcement tape for reinforcing the space portion in the concealed type slide fastener with the separable bottom end stop can be stuck through a simple processing means and further, a space portion having an optimum configuration to a fastener chain in a case where the remaining amount at the fastener element removed portion is small can be obtained.

Preferably, the reinforcement tape is stuck also to a rear face of the fastener tape at the space portion formed on the fastener chain of the concealed type slide fastener so that the front and rear surfaces are formed integrally with each other. Consequently, there is such an effect that the entire space portion in the concealed type slide fastener with the separable bottom end stop can be manufactured with a firm structure and further, the space portion can be gripped easily thereby facilitating separating and fitting-in operation.

And preferably, a box pin or an insert pin of the separable bottom end stop is attached so as to cover from a rear face of the edge portion having a U-shaped section of the fastener tape at the space portion formed on the fastener chain of the concealed type slide fastener to the fastener element removed portion, that is, the remaining core cord and sewing yarns, so that an outer front surface of the edge portion having the U-shaped section of the fastener tape at the space portion is exposed. Consequently, the separable bottom end stop capable of separating and fitting-in securely can be attached easily by making a best use of the U-shaped edge portion at the space portion in the concealed type slide fastener with the separable bottom end stop. As described above, the effects, which the invention achieves, are very remarkable.

BRIEF DESCRIPTION OF THE DRAWINGS

FIG. 7 is a sectional view of a fastener chain including a slider at the time when the insert pin of the same concealed type slide fastener is fitted-in.

DESCRIPTION OF THE PREFERRED EMBODIMENTS

Hereinafter, an embodiment of a concealed type slide fastener with a separable bottom end stop of the invention will be described in detail with reference to the accompanying drawings.

Figure 1:
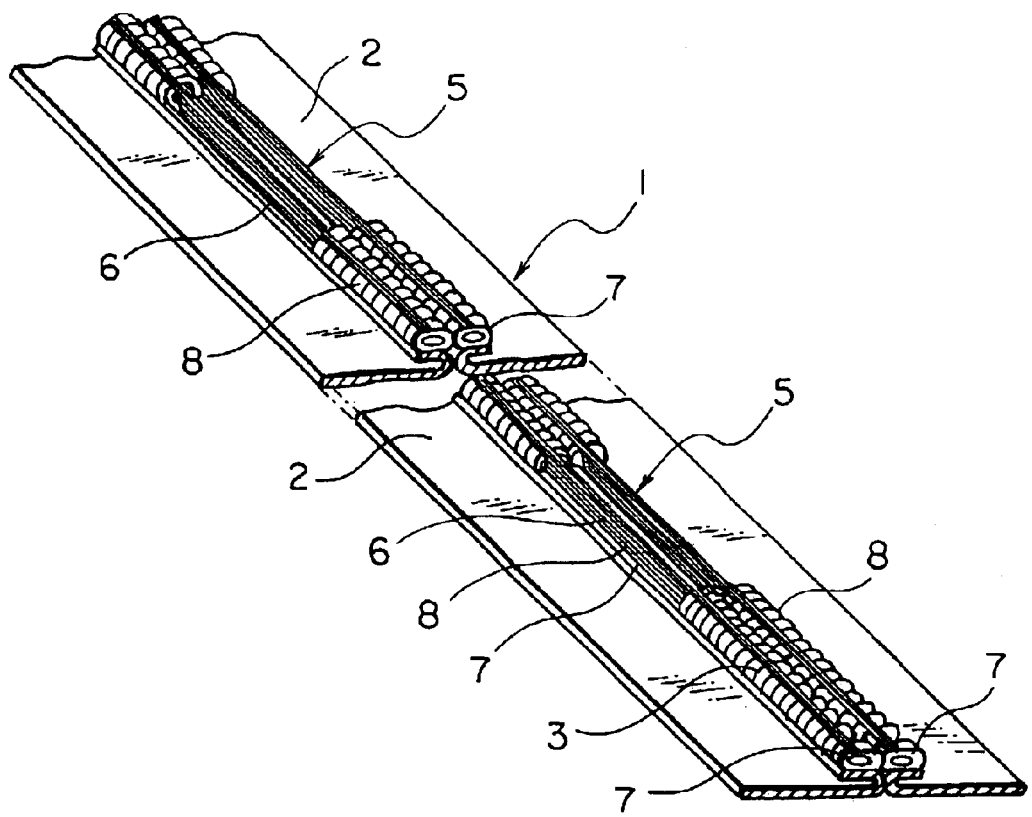
FIG. 1 is a perspective view of a rear surface of a long concealed type slide fastener chain.

The slide fastener of the invention is a concealed type slide fastener whose fastener elements are not seen from its front surface. In a long fastener chain 1, as shown in FIG. 1, fastener elements 3 are mounted along an edge portion 9 formed in a U shape by folding a side edge of a fastener tape 2. As the fastener element 3 of this embodiment, a coil-like fastener element 3 formed by winding mono-filament such as polyamide and polyester into a coil is applied. Space portions 5 having no coil-like fastener elements 3 are provided at a constant interval in the longitudinal direction of the fastener chain 1. Then, a fastener element removed portion 6 is formed on the edge portion 9 of the fastener tape 2 at the space portion 5 by removing the coil-like fastener elements 3 of a predetermined length from the fastener tape 2. A core cord 7 and sewing yarns 8 for double-ring sewing or the like used for attaching the fastener elements 3 to the fastener tape 2 are left on the fastener element removed portion 6.

In the meantime, for the fastener chain 1, various kinds of fastener elements, for example, zigzag-like fastener element formed of mono-filament such as polyamide and polyester, a single-unit metallic fastener element, and a single-unit injection molded fastener element formed of thermoplastic resin may be used as well as the coil-like fastener element.

In addition, in a knitted-in slide fastener in which the fastener elements 3 are knitted at the same time when the fastener tape 2 is knitted, the fastener element removed portion 6 may include only an element fixing yarn for tightening and fixing the fastener elements 3 to the fastener tape 2.

Figure 2:
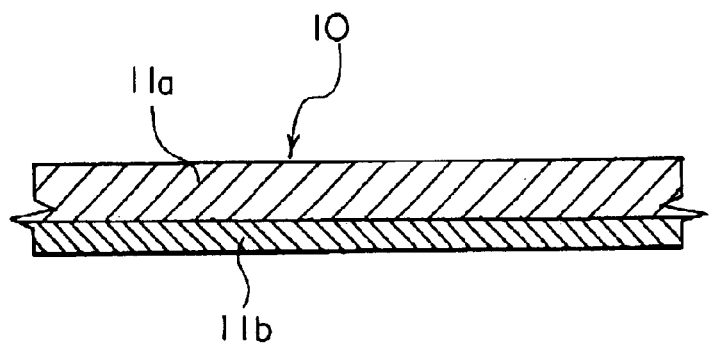
FIG. 2 is a sectional view of a tape to be stuck.
Figure 3:
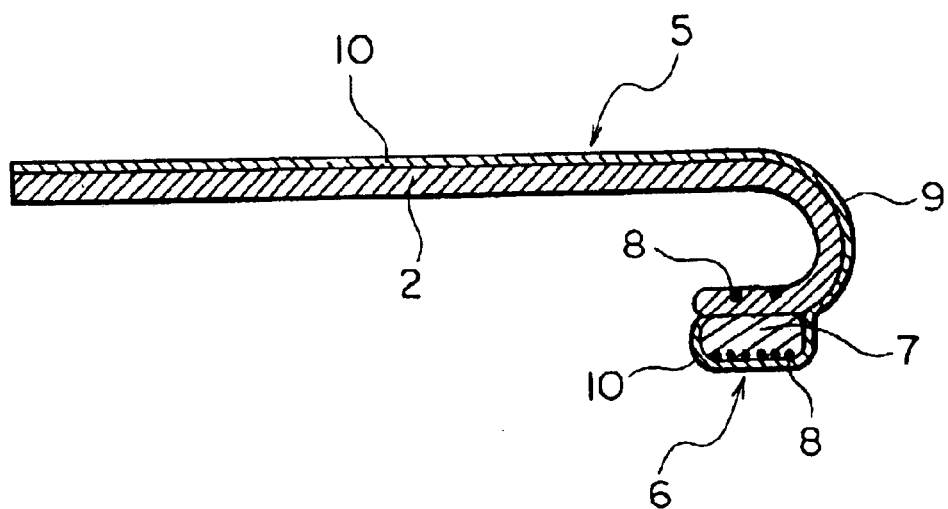
FIG. 3 is a sectional view of a space portion of the concealed type slide fastener.

As shown in FIG. 2, a reinforcement tape 10 composed of double layers, whose front surface is made of a thermoplastic elastomer film 11a while its rear face is made of hot-melt adhesive agent 11b, for example, whose front surface is made of a polyester base elastomer film while its rear face is made of polyester base hot melt adhesive agent, is supplied to a front surface of the space portion 5 formed in the fastener chain 1 and stuck there by ultrasonic welding. As shown in FIG. 3, a sequence of the reinforcement tape 10 is stuck to the front surface of the fastener tape 2 at the space portion 5, and the core cord 7 and sewing yarns 8 for double-ring sewing remaining on the fastener tape 2 as the fastener element removed portion 6 with ultrasonic welding, such that the tape surrounds them, and the edge portion 9 at the space portion 5 is formed into a U shape by heating.

In addition to the above-described film as the reinforcement tape 10, a resin film such as a multi-layer film and a fiber reinforcement film, or taffeta made of synthetic fiber filament yarn, rayon, acetate, nylon, polyester or the like, wherein adhesive agent such as the aforementioned hot melt adhesive agent is attached or made to intervene, may be used and the reinforcement tape 10 may be stuck to the front surface of the fastener tape 2 at the space portion 5 and the fastener element removed portion 6 produced by removing the fastener elements 3 from the surface of the fastener tape 2 by adhere means such as ultrasonic wave, high frequency wave and a heater.

Figure 4:
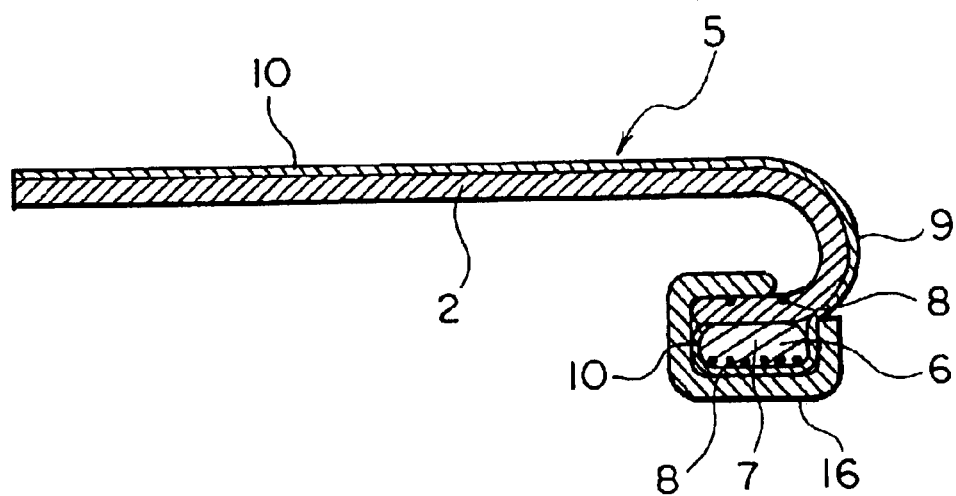
FIG. 4 is a sectional view in case where an insert pin is attached to the same space portion.
Figure 5:
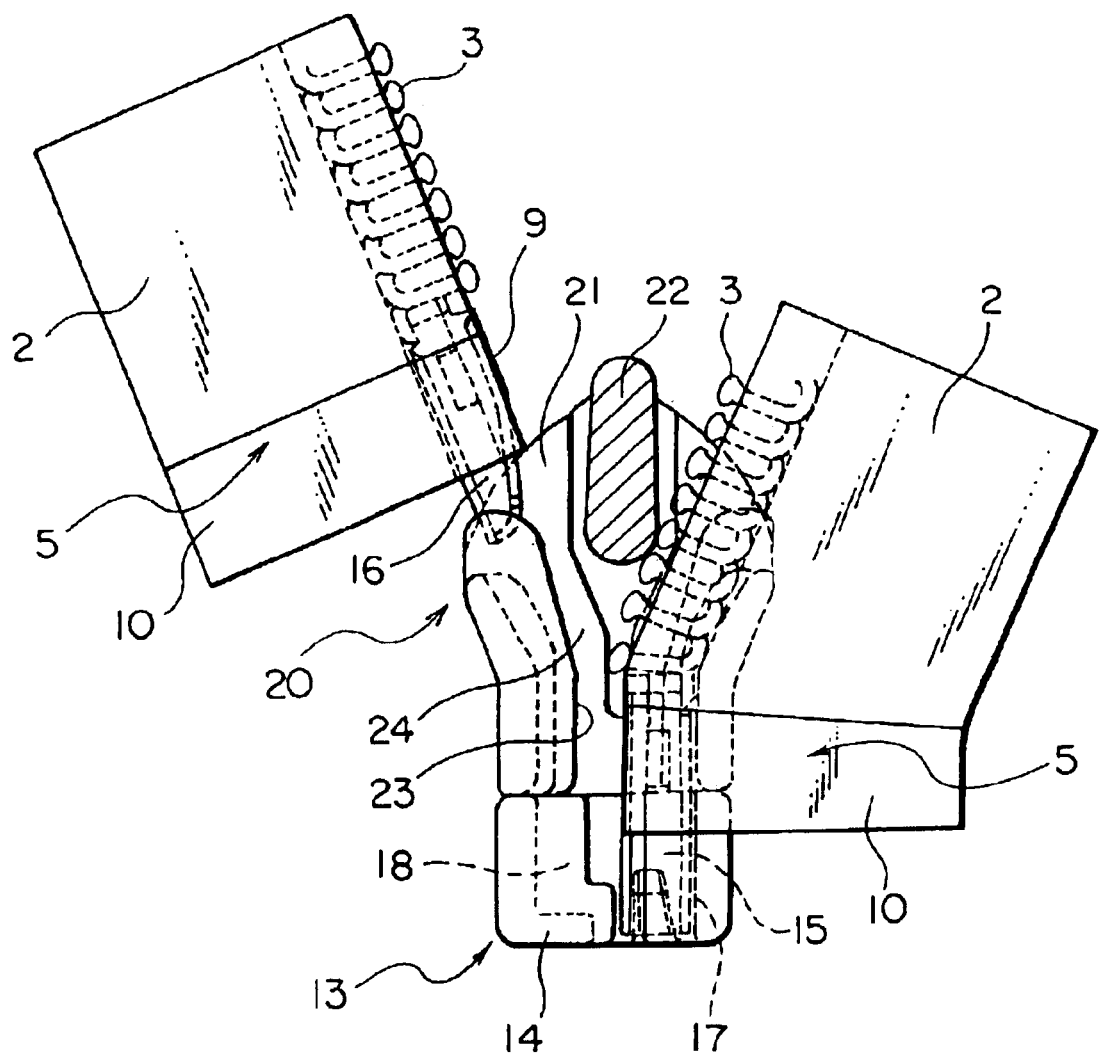
FIG. 5 is a detailed front view at the time when a separable bottom end stop of the concealed type slide fastener is separated.

After the reinforcement tape 10 is stuck to the front surface of the space portion 5 as described above, the fastener chain 1 is cut at the space portion 5 and then, an insert pin 16 of a metallic separable bottom end stop 13 having a substantially square-tube-shaped section as shown in FIG. 4 is attached to an end portion of the space portion 5 including the fastener element removed portion 6 so as to surround and cover the end portion. Further, a box pin 15 is attached to the end portion of the space portion 5 symmetrically and the box 14 is attached to a front end of the box pin 15, thereby completing the separable bottom end stop 13. An upper stopper is attached to the other end of the fastener chain 1 which is cut at the space portion 5.

In the meantime, the box 14, the box pin 15 and the insert pin 16 of the separable bottom end stop 13 may be molded respectively using such thermoplastic resin as polyamide, polyacetal, polypropylene, polybutylene terphthalate by injection molding means and attached.

Figure 6:
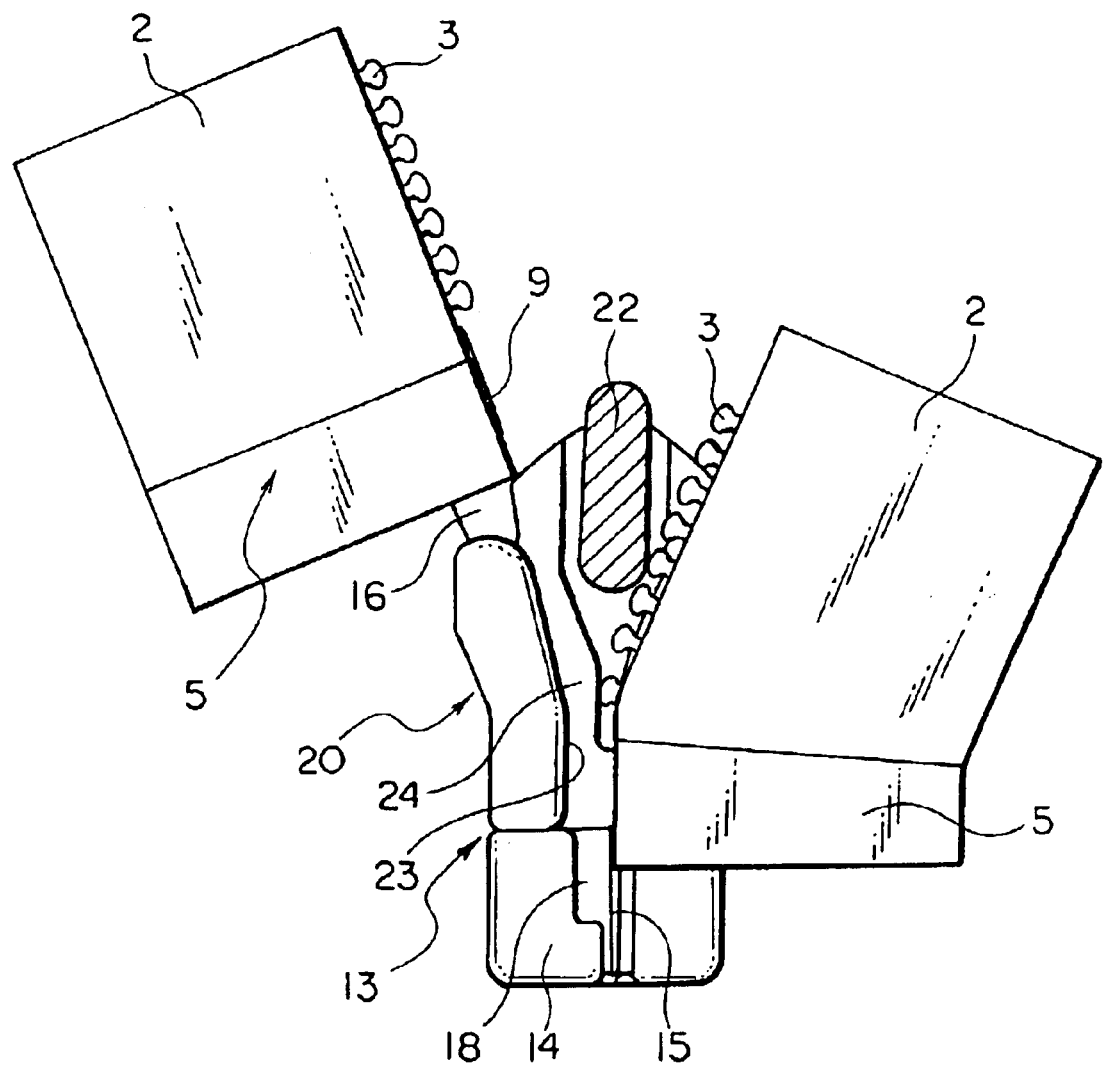
FIG. 6 is a front view at the time when the separable bottom end stop of the same concealed type slide fastener is released.
Figure 7:
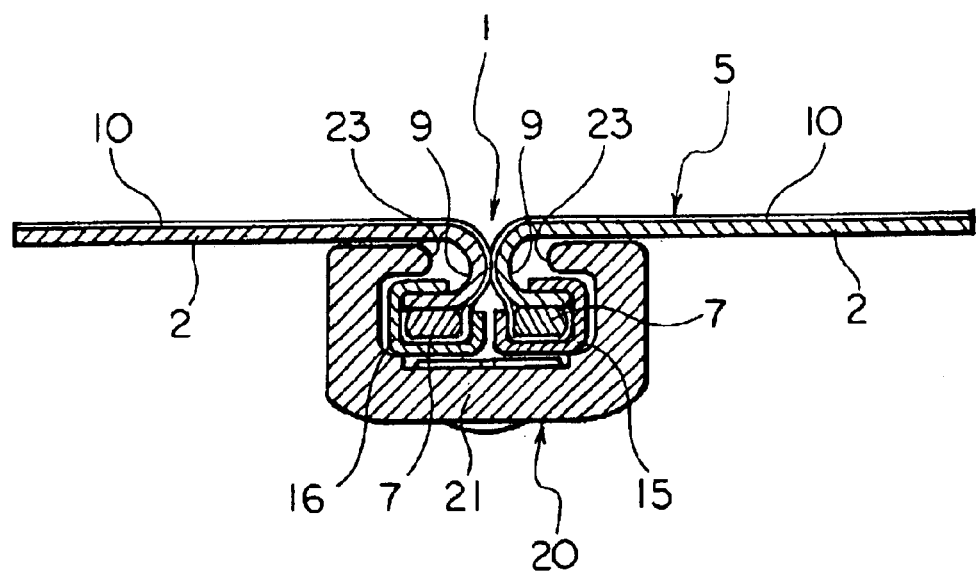

As for the operation of a completed concealed type slide fastener with the separable bottom end stop 13, a slider 20 inserted slidably in a stringer of the fastener chain 1 is abut to the box 14 of the separable bottom end stop 13 in which the box pin 15 and the box 14 are fixed, as shown in FIG. 6. Then, the insert pin 16 fixed to the space portion 5 is inserted into a guide groove 24 of the slider 20 and an insert pin insertion hole 18 of the box 14 and thereafter, by pulling up the slider 20, right and left fastener elements 3 are coupled with each other so as to close the fastener chain 1. When the insert pin 16 is inserted into the slider 20 upon separating and fitting-in operation of the slide fastener, the reinforcement tape 10 stuck to the front surface of the edge portion 9 of the fastener tape 2 at the space portion 5 comes into contact with a diamond 22 of the slider 20, but the fastener tape 2 does not make a direct contact with the diamond 22.

Figure 10:
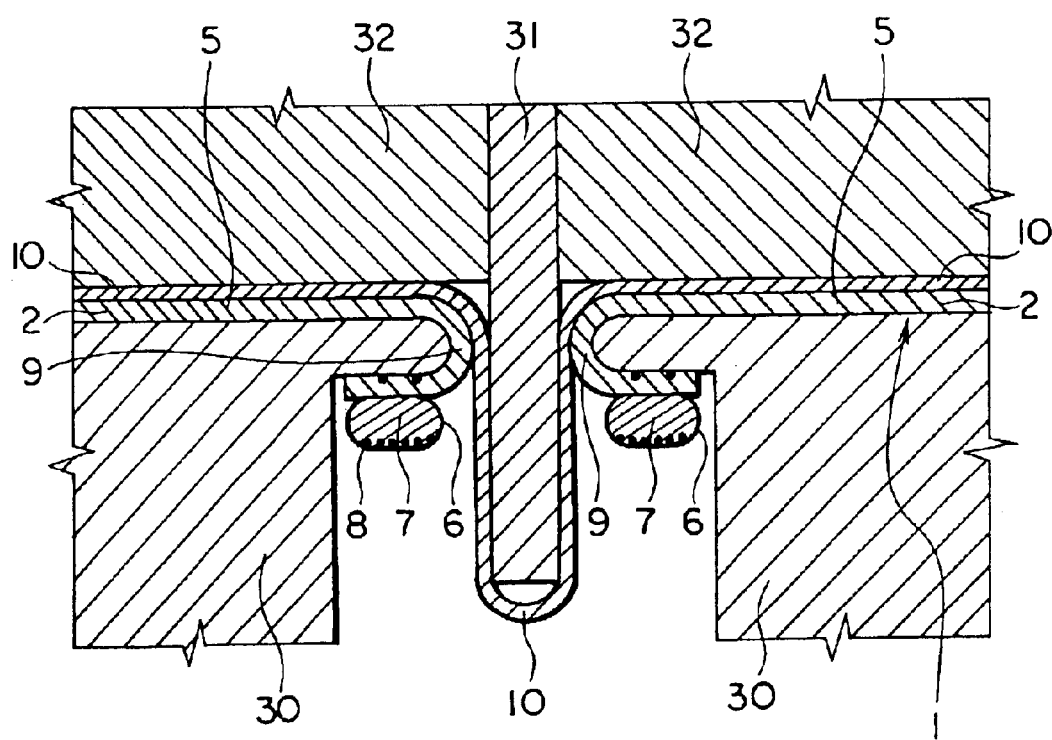
FIG. 10 is a sectional view showing a major portion of a processing means.
Figure 11:
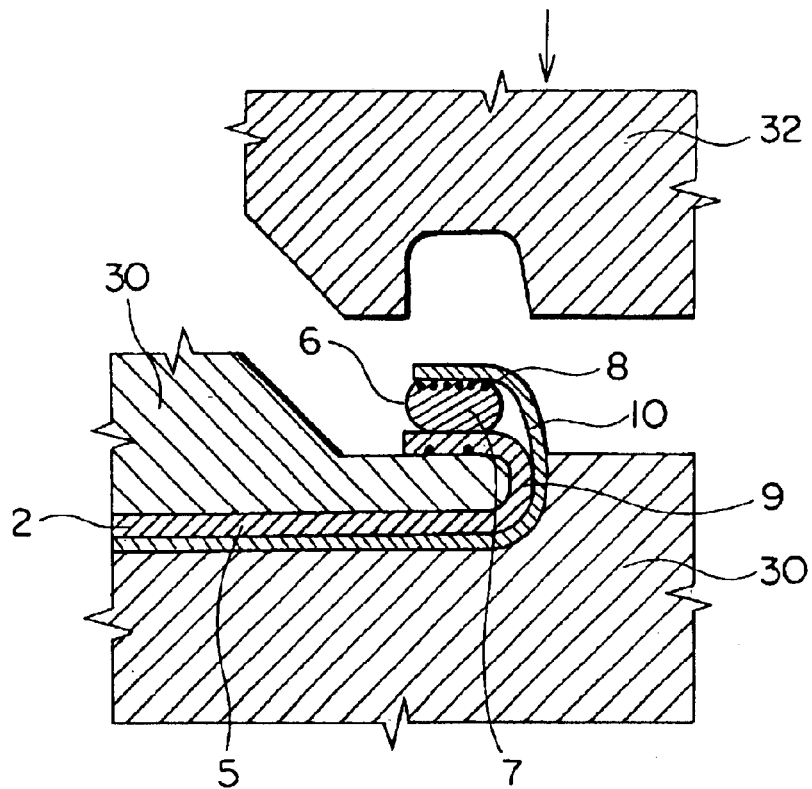
FIG. 11 is a sectional view showing a major portion of the same processing means.

An example of processing means for sticking the reinforcement tape 10 to the space portion 5 of this concealed type slide fastener will be described below. As shown in FIG. 10, a gap is provided in the center between right and left anvils 30 and a tool horn 32 which allows a push-down member 31 to be inserted into the gap is disposed at the upper side of the anvils 30. With the anvils 30 set apart from each other so as to guide the edge portion 9 of the fastener tape 2 into a U shape, the fastener chain 1 is placed on the anvil 30 and the reinforcement tape 10, whose front surface is made of thermoplastic elastomer film 11*a* while the rear surface is made of hot melt adhesive agent 11*b*, is placed on the right and left fastener tapes 2 such that the hot melt adhesive agent 11*b* comes into contact with the fastener tape 2. After that, the tool horn 32 is descended to the anvils 30, so that the reinforcement tape 10 is pressed down into a U shape at a gap portion. At the same time, with the tool horn 32 pressed against the anvils 30, ultrasonic welding is carried out. Next, the front end of the reinforcement tape 10 depressed by the push-down member 31 is cut and the tool horn 32 is descended to and pressed against the anvil 30 from upper part as shown in FIG. 11, so that the cut reinforcement tape 10 wraps the fastener element removed portion 6 composed of the core cord 7 and the sewing yarns 8, existing at the end portion of the space portion 5. Then, ultrasonic welding is carried out so as to stick the reinforcement tape 10 to the space portion 5, thereby forming the edge portion 9.

Figure 8:
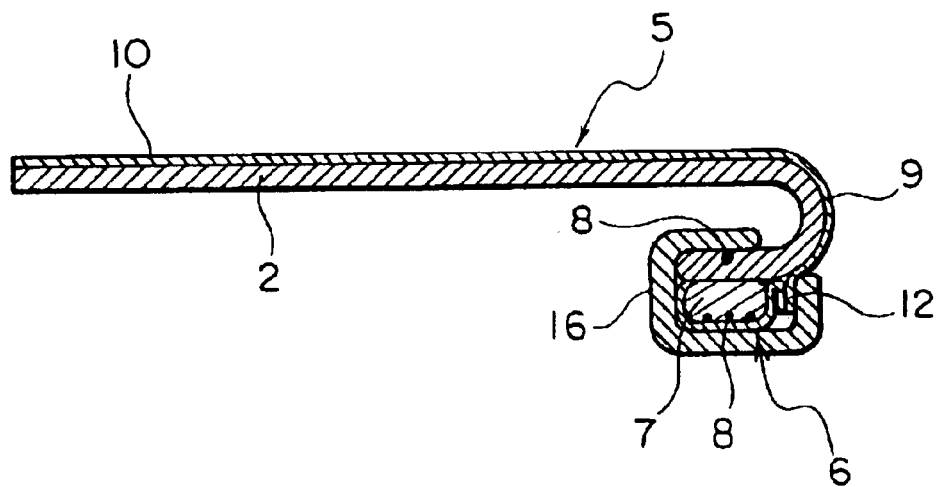
FIG. 8 is a sectional view showing a modification of a case where an insert pin is attached to the space portion.
Figure 12:
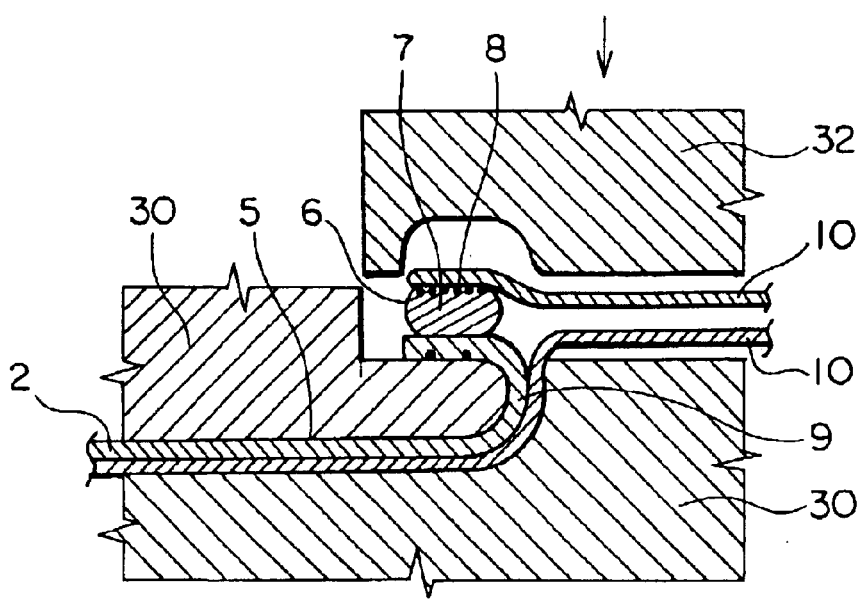
FIG. 12 is a sectional view showing a major portion of another processing means.

According to a modification shown in FIG. 8, processing means for sticking the reinforcement tape 10 to the space portion 5 of the fastener tape 2 is different from the above-described example. A U-shaped edge portion 9 of the space portion 5 is fixed to the anvil 30 as shown in FIG. 12. And then, a reinforcement tape 10 coated with hot melt adhesive agent 11*b*, which is to be stuck to the fastener tape 2 in a lateral direction with respect to the anvil 30, and a reinforcement tape 10 coated with hot melt adhesive agent 11*b*, which wraps the fastener element removed portion 6 of the core cord 7 and the sewing yarns 8 left on the edge of the fastener tape 2, are formed separately and respectively supplied to each place from a lateral direction. Then, at the U-shaped edge portion 9 of the space portion 5, the tool horn 32 is pressed against the anvil 30 from upper part and the both reinforcement tapes 10 are overlapped at a side face of the core cord 7 and then, ultrasonic welding is carried out so as to form a joint portion 12, so that the reinforcement tape 10 is stuck to the front surface of the space portion 5. The reinforcement tape 10 is cut at the joint portion 12. This style of sticking work enables the space portion 5 to be formed and processed with a very simple work. Then, the insert pin 16 is attached so as to wrap the joint portion 12, in which the reinforcement tape 10 stuck to the fastener tape 2 and the reinforcement tape 10 for wrapping the fastener element removed portion 6 are joined together, and the fastener element removed portion 6 integrally. Further, the box pin 15 is also attached symmetrically and finally, the space portion of the concealed type slide fastener is completed.

Figure 13:
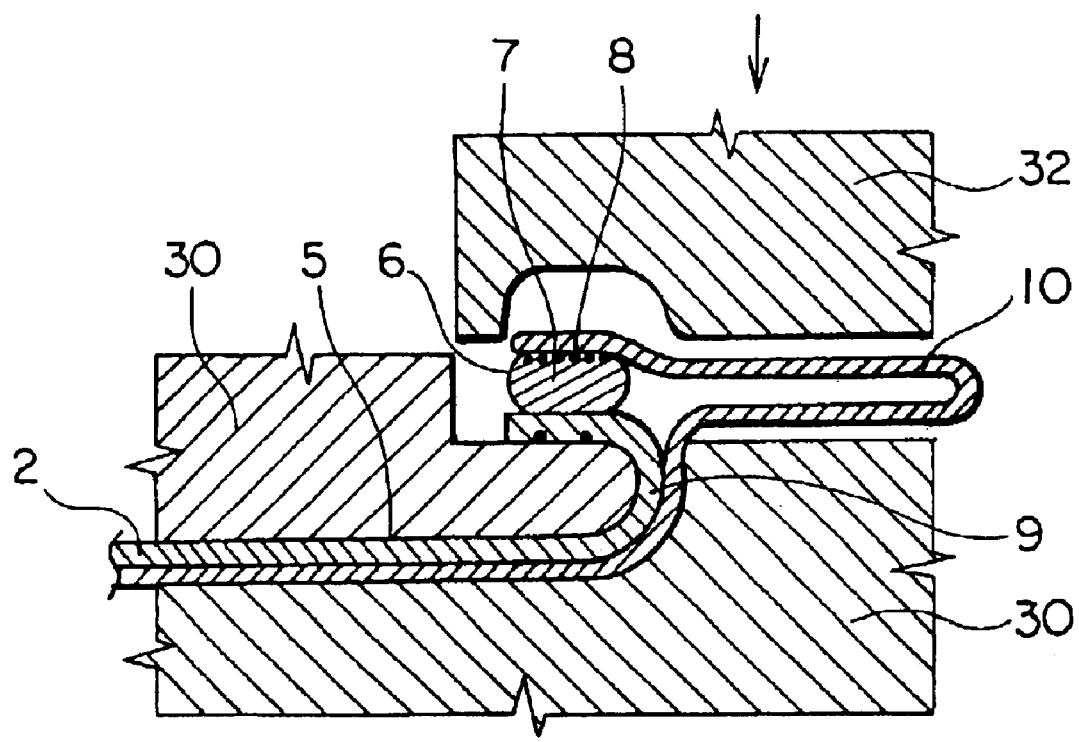
FIG. 13 is a sectional view showing a modification of the same processing means.

Meanwhile, as shown in FIG. 13, the reinforcement tape 10 stuck to the fastener tape 2 and the reinforcement tape 10 for wrapping the surface of the fastener element removed portion 6 may be of a sequence of the reinforcement tape 10, and the reinforcement tape 10 stuck to the fastener tape 2 and the reinforcement tape 10 for wrapping the fastener element removed portion 6 are stuck together by descending and pressing the tool horn 32 against the anvil 30 from upper part so as to form the joint portion at a side face of the core cord 7 and the joint portion 12 is cut.

Figure 9:
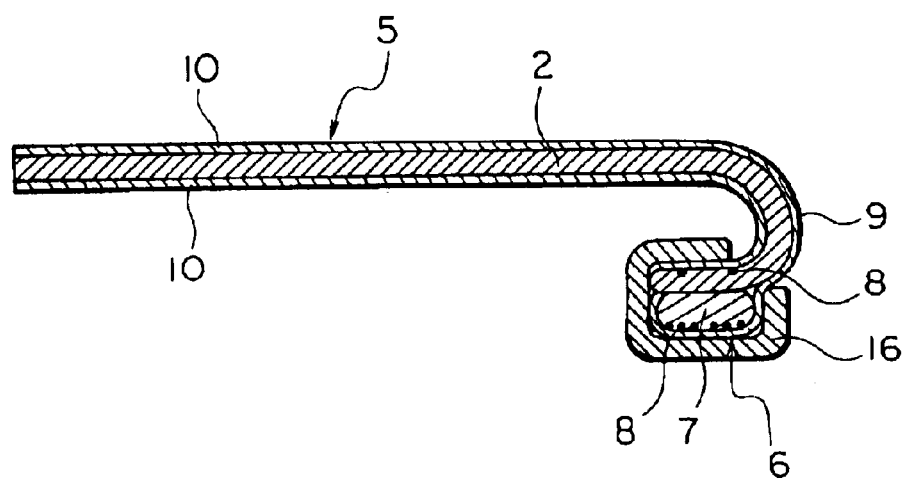
FIG. 9 is a sectional view showing a modification of a case where a tape is stuck to front and rear surfaces of the space portion.

A modification shown in FIG. 9 indicates a space portion 5 of a concealed type slide fastener in which the reinforcement tape 10 is stuck so as to cover the front surfaces of the fastener tape 2 and the fastener element removed portion 6 at the space portion 5 of the concealed type slide fastener as shown in FIG. 3, while the reinforcement tape 10 coated with the hot melt adhesive agent 11*b* is stuck also to the rear face of this space portion 5. The thermoplastic elastomer film is stuck to the front and rear surfaces of the space portion 5 and as shown in FIG. 4, the insert pin 16 of the separable bottom end stop 13 is attached so as to wrap the side edge of the fastener tape 2 and the fastener element removed portion 6. Consequently, the space portion 5 can be formed and fixed firmly. Further, the box pin 15 is attached symmetrically, so that the space portion 5 of the concealed type slide fastener is completed.

What is claimed is:

1. A concealed type slide fastener with a separable bottom end stop comprising a pair of fastener tapes and fastener elements, in which the separable bottom end stop is attached to a space portion including a fastener element removed portion having no fastener elements and an edge portion formed into a U shape of each of the fastener tapes through a reinforcement tape, wherein the reinforcement tape is stuck to a front surface of the space portion and at least a front surface of the U-shaped edge portion of the fastener tape is covered with the reinforcement tape; and wherein a box pin or an insert pin of the separable bottom end stop is attached so as to cover a fastener element removed portion at the space portion, so that an outer front surface of the U-shaped edge portion of the fastener tape is exposed.

2. A concealed type slide fastener with a separable bottom end stop according to claim 1, wherein a sequence of the reinforcement tape is stuck to the fastener tape and the fastener element removed portion at the space portion, such that it covers the fastener tape and the fastener element removed portion.

3. A concealed type slide fastener with a separable bottom end stop according to claim 1, wherein separate reinforcement tapes are respectively stuck to the fastener tape and the fastener element removed portion at the space portion, such that they cover the fastener tape and the fastener element removed portion respectively, while the reinforcement tapes are joined together to form a joint portion.

4. A concealed type slide fastener with a separable bottom end stop according to claim 1, wherein the reinforcement tape is stuck also to a rear face of the fastener tape at the space portion.

* * * * *